(12) United States Patent
Meoli et al.

(10) Patent No.: US 10,272,755 B2
(45) Date of Patent: Apr. 30, 2019

(54) SIDE MOUNT CANOPY LOCKING AND RELEASING HINGE APPARATUS FOR MOUNTING A CANOPY TO THE FUSELAGE OF A VEHICLE

(71) Applicants: Frederick G. Meoli, Canton, OH (US); Brandon D. Masidonski, Canton, OH (US)

(72) Inventors: Frederick G. Meoli, Canton, OH (US); Brandon D. Masidonski, Canton, OH (US)

(*) Notice: Subject to any disclaimer, the term of this patent is extended or adjusted under 35 U.S.C. 154(b) by 826 days.

(21) Appl. No.: 14/922,653

(22) Filed: Oct. 26, 2015

(65) Prior Publication Data

US 2017/0114579 A1    Apr. 27, 2017

(51) Int. Cl.

| | |
|---|---|
| *E05B 17/20* | (2006.01) |
| *E05C 1/08* | (2006.01) |
| *E05C 9/14* | (2006.01) |
| *B60J 7/19* | (2006.01) |
| *E05B 63/00* | (2006.01) |
| *E05B 63/14* | (2006.01) |
| *E05B 77/02* | (2014.01) |
| *E05B 83/36* | (2014.01) |

(Continued)

(52) U.S. Cl.
CPC ............... *B60J 7/19* (2013.01); *B60J 7/1628* (2013.01); *E05B 63/0008* (2013.01); *E05B 63/0065* (2013.01); *E05B 63/14* (2013.01); *E05B 77/02* (2013.01); *E05B 83/36* (2013.01); *E05B 65/0025* (2013.01); *E05B 2063/0026* (2013.01)

(58) Field of Classification Search
CPC ... B64C 1/32; B60J 7/19; B60J 7/1628; E05B 83/36; E05B 77/02; E05B 63/14; E05B 63/0065; E05B 63/0008; E05B 2063/0026; E05B 65/0025
USPC .................................................... 244/122 AF
See application file for complete search history.

(56) References Cited

U.S. PATENT DOCUMENTS 5,205,516 A * 4/1993 Bright .................. B64C 1/1476
244/121
8,061,656 B1 * 11/2011 Renn ..................... B64C 1/1476
244/122 AE

(Continued)

*Primary Examiner* — Kristina R Fulton
*Assistant Examiner* — Thomas L Neubauer
(74) *Attorney, Agent, or Firm* — Hudak, Shunk & Farine Co. LPA (57) ABSTRACT

This invention relates to a canopy locking and releasing apparatus for mounting a canopy to the fuselage of a vehicle. The canopy locking and releasing apparatus is comprised of several mechanisms. These include internal canopy locking and releasing mechanism, the external (Type A, B, or C) canopy locking and releasing mechanisms, a hinge plate and base mechanism, a hinge retaining pin, and a fuselage locking and releasing device for the hinge base. The apparatus is mounted on the sides of a canopy and attached to the cockpit of a vehicle. This apparatus allows for quick and easy opening of the canopy for routine or emergent access and driver entry or egress. An unique advantage of the canopy side mount locking and releasing hinge mechanism for vehicles is that the cockpit is easily accessible from either side of the vehicle, from the inside and outside of the vehicle, or if necessary, from both sides of the vehicle at once. Additionally, there is shown an alternative use for the internal locking and releasing mechanism and the retaining pin.

35 Claims, 7 Drawing Sheets

(51) Int. Cl.
 *B60J 7/16* (2006.01)
 *E05B 65/00* (2006.01)

(56) References Cited

U.S. PATENT DOCUMENTS

| | | |
|---|---|---|
| 8,465,062 B2 | 6/2013 | Weinerman et al. |
| 8,931,738 B2 * | 1/2015 | White ................. B64C 7/00 244/121 |
| 2002/0167175 A1 | 11/2002 | Weyerstall et al. |
| 2015/0076835 A1 | 3/2015 | Mitchell et al. |

* cited by examiner

SIDE MOUNT CANOPY LOCKING AND RELEASING HINGE APPARATUS FOR MOUNTING A CANOPY TO THE FUSELAGE OF A VEHICLE

FIELD OF THE INVENTION

This invention relates to an apparatus for a side mount canopy locking and release hinge mechanism for vehicles. More specifically, the apparatus includes a mechanism of clamping the canopy to a hinge mechanism, and then connecting these parts to a fuselage. The canopy clamping mechanism is comprised of an internal canopy locking and releasing mechanism, a canopy retaining pin, and an external (Type A, B, or C) canopy locking and releasing mechanism. The hinge mechanism is comprised of the hinge plate, a hinge retaining pin, and a hinge base. The aforementioned hinge plate is clamped to the canopy via the above mentioned internal and external locking and releasing devices, and then, via the hinge mechanism, is connected to the fuselage by the fuselage locking and releasing mechanism.

BACKGROUND OF THE INVENTION

Open cockpit racing has long been the standard. However, within the last few years, there have been several injuries to driver's heads and several deaths from these injuries. It is felt that soon, polycarbonate or Lexan or similar type canopies will be required or utilized. The present invention relates to a unique canopy side mount apparatus with up to five quick release mechanisms (2 from inside the cockpit and 3 from outside the cockpit). While preferably the canopy locking and release apparatus of the present invention is employed on the sides of a vehicle, it also can be employed on the front or back portion of the vehicle canopy, or any combination thereof. In case of emergency, it may be imperative that the driver is able to exit the vehicle as soon as possible. There is clearly a need for a simple and easy to use canopy release mechanism. This unique canopy side mount hinge release mechanism allows for canopy release from either side of the vehicle both internally and externally. This canopy side mount hinge release mechanism has multiple redundant release systems.

SUMMARY OF THE INVENTION

There are a multitude of factors in the construction of the vehicle's fuselage sides. The simplicity of this apparatus's fuselage locking device for the hinge base is that it can be easily adapted to many different types of fuselages.

Additionally, due to the small profile of the components of this apparatus for canopy side mount locking and releasing hinge mechanism for vehicles, the impact on aerodynamics and driver field of vision are low.

Release mechanisms of this apparatus include:
1) When the internal locking and releasing mechanism strap is pulled releasing the canopy retaining pin, the hinge plate is forced outward by a spring at the hinge pin, thereby releasing the canopy from the hinge and allowing the canopy to be raised.
2) The external locking and releasing mechanism Type A can be released by unlocking the thumb lock and pulling on a 'leverage' arm. This releases canopy retaining pin from the outside lock allowing the canopy retaining pin to pass through the hinge plate and canopy, thereby releasing the canopy from the hinge mechanism and allowing the canopy to be raised.
3) The external locking and release mechanism Type C can be released by pressing the thumb lock and rotating the external locking and releasing cover. This releases canopy retaining pin from the outside lock allowing the canopy retaining pin to pass through the hinge plate and canopy, thereby releasing the canopy from the hinge mechanism and allowing the canopy to be raised
4) The hinge can be released by removing the main hinge retaining pin, separating the hinge flange from the hinge base mount, and allowing the canopy to be raised.
5) The hinge base mount can be released from the fuselage by utilizing the fuselage locking and releasing mechanism from inside the cockpit by pulling on the fuselage locking and releasing mechanism release strap.
6) The hinge base mount can be released from the fuselage by utilizing the fuselage locking and releasing mechanism from outside the cockpit by pushing on the fuselage locking and releasing mechanism release button.

BRIEF DESCRIPTION OF THE DRAWINGS

The invention will now be described, by way of example only, with reference to the accompanying drawings in which.

DETAILED DESCRIPTION OF THE INVENTION

Throughout the following description and claims, terms such as "vertical", "horizontal", "top", "bottom", "upper," "lower," "front," "rear," "lateral," "inferior," "frontal," and the like may be used to describe various parts of the apparatus according to the invention. These terms of reference are used for convenience only, and are generally consistent with the orientation of the apparatus as it is shown in the drawings.

Figure 1:
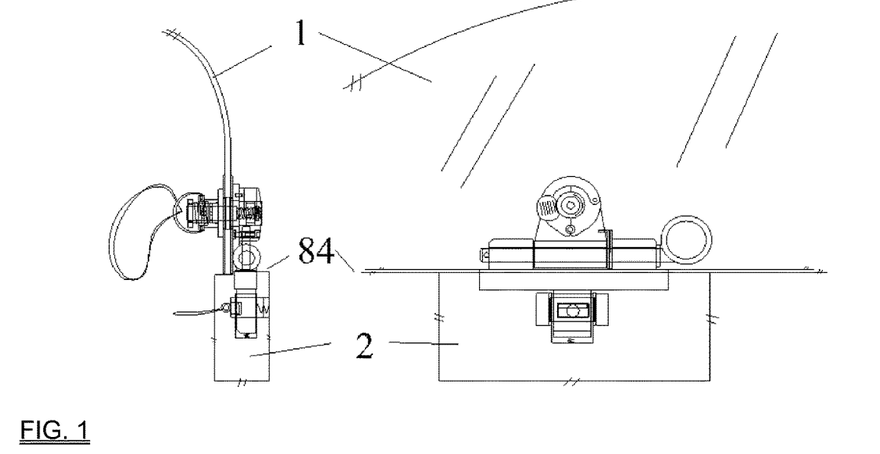
FIG. 1 is a lateral and frontal view of the assembled canopy side mount locking and releasing hinge mechanisms type A, with a section of the canopy and fuselage, for purposes of overview of the apparatus.

In one embodiment, there is provided an apparatus for canopy side, or front, or rear mount locking and releasing hinge mechanism for vehicles, as in the case of an emergency, or for standard cockpit access. A canopy may be defined but not limited to a structure which by its application defines one environment form another. The canopy may be a clear or opaque structure made of metal or glass or plastic. As it relates to the primary function of this apparatus, the canopy is a structure defining the 'inside' of a vehicle from the 'outside' of a vehicle. FIG. 1 provides an overview of the apparatus in a side mount configuration on a racing vehicle with a clear type canopy as well as a representation of the apparatus as it is attached to the fuselage of said vehicle. This apparatus comprises an internal locking and releasing mechanism, FIG. 3, a canopy retaining pin FIG. 4, and an external locking and releasing mechanism (Types A and C, FIGS. 2, 5, 6, 9, and 10), or non-quick external locking mechanism (Type B, FIGS. 2, 7, and 8). These internal and external locking and releasing mechanisms combine to clamp a canopy 1 and a hinge plate 33 (FIGS. 2, 5, 6, 7, 9, 10, 11) in place via a canopy retaining pin 21. The hinge plate 33 is connected to a hinge base 65 (FIGS. 2, 5, 7, 9, 11, 12) via a hinge retaining pin 70 (FIGS. 1, 2, 5, 7, 9, 11). The hinge base 65 is fixed to the fuselage 2 by a fuselage locking and releasing mechanism 80 (FIGS. 2, 5, 7, 9, 11, 12). The canopy hinge assembly is denoted 66 FIG. 11. Level of top of fuselage side is described as 84.

The internal locking and release mechanism can be easily released by pulling on a release strap 4 or on the outside retaining sleeve 8 of the mechanism itself, thereby releasing the canopy retaining pin 21. The external locking mechanism, Type A or C, can be released from the outside by a thumb release mechanism 32 or 64 respectively, thereby releasing the grooved barrel of the canopy retaining pin. The non-quick release external locking device (Type B) cannot be released quickly from the outside, but allows for improved aerodynamics and simplicity.

The importance of the internal locking and releasing mechanism, the canopy retaining pin and grooved barrel mechanism, and the external locking and release mechanism is to form a strong clamping device onto the canopy. Additionally, there is a thin layer of compressible sealant, such as rubber, on the clamping flanges of both the internal and external locking mechanisms and hinge plate thereby maintaining a good canopy weather seal, allowing for mild shock absorption, and increasing friction of the internal and external locking and releasing mechanism's clamping flanges at the canopy 1 and/or canopy reinforcing plates 27.

When assembled, the hinge plate 33 and the internal and external locking and releasing mechanisms and thereby, the canopy, act as one unit and are attached to the hinge base 65 by a hinge retaining pin 70. One end of the hinge retaining pin 70 is held in place with two spring ball locks 72. On the opposite end of the hinge retaining pin is a ring-shaped 'pull' handle 73.

The hinge plate 33 of the hinge mechanism falls outward away from the canopy when the internal locking and releasing mechanisms or external locking and releasing mechanisms Type A and C are unlocked and the canopy retaining pin is released. The outward swinging motion of the hinge plate 33 is enhanced by a wound spring 83. The wound spring 83 is held in place by the hinge retaining pin 70 and wound spring 83 side arms about the hinge plate 33 and the hinge base 65. When the hinge plate 33 is in the vertical orientation and clamped to the canopy, and the hinge base 65 is attached to the fuselage, the hinge retaining spring 83 is held in compression.

A portion of the vehicle fuselage 2 forms the lateral margins (left and right sides) of the cockpit. The canopy side mount locking and releasing hinge mechanism via its hinge base 65 is fixed to the fuselage at the top of the lateral margins of the cockpit by means of a simple fuselage locking and release mechanism 80. The hinge base 65 on its inferior aspect has a protruding locking tab 67 which is inserted in a vertical direction into the fuselage locking mechanism 80. A portion of the hinge base 65, up to the inferior margin of the hinge base barrels 69, is recessed into the top of the fuselage increasing torsional rigidity. This fuselage hinge locking mechanism, FIGS. 11 and 12, can be released by a pull cord 90 on the inside of the cockpit or by a pushbutton 92 on the outside of the fuselage.

The importance of the hinge mechanism of this apparatus is to form a mechanical connection between the hinge base 65 at the fuselage and the hinge plate 33 at the canopy. When bilateral hinge locking and releasing mechanisms (two hinge mechanisms, one mounted at each side of the cockpit) are utilized, this allows the canopy to be opened for standard access by hinge action utilizing the fuselage hinge locking and releasing mechanism of the apparatus.

Utilizing the Type A or C external locking and releasing mechanism and with the apparatus mounted to both sides of the fuselage (and the canopy), there are available multiple canopy release points. These release mechanisms are the canopy retaining pin internal locking and release mechanism pull strap 4, FIG. 3, the external locking and releasing mechanisms (Type A or C), the base hinge retaining pin 70 FIG. 11, the fuselage lock internal release pull cord 90, FIG. 12, and the fuselage lock external push button 92, FIG. 12.

In summary, the apparatus for canopy side, front, and/or rear mount locking and releasing hinge mechanism for an open cockpit vehicle with placement on both sides of the cockpit allows for up to four internal release mechanisms and six external release mechanisms for a total of up to 10 release mechanisms.

Referring to the Drawings:

FIG. 1 is an apparatus overview for a canopy side mount locking and releasing hinge mechanism for preferably open cockpit vehicles with addition of canopy, although it can also be used for closed cockpit vehicles. FIG. 1 includes a portion of the cockpit canopy 1 and a portion of the cockpit fuselage side wall 2 for general reference as it relates to installation of apparatus for canopy side, front, and/or rear mount locking and releasing hinge mechanism I for vehicles. The canopy hinge assembly is denoted 66 FIG. 11. Level of top of fuselage side is described as 84 for reference to depth of hinge base 65 installation.

Figure 2:
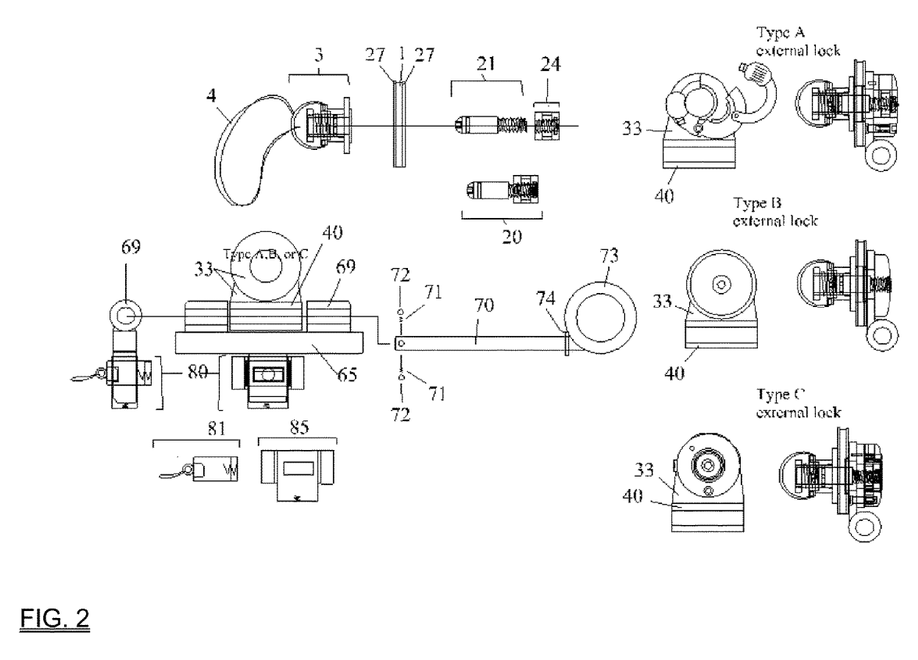
FIG. 2 is an overview of the components of the internal canopy side mount locking and releasing hinge mechanism for vehicles with additional side views of assembled type A, B, and C outside locking and releasing mechanisms.

FIG. 2 is provided for an overview of the parts of the apparatus and can be used as an overall reference.

Figure 3:
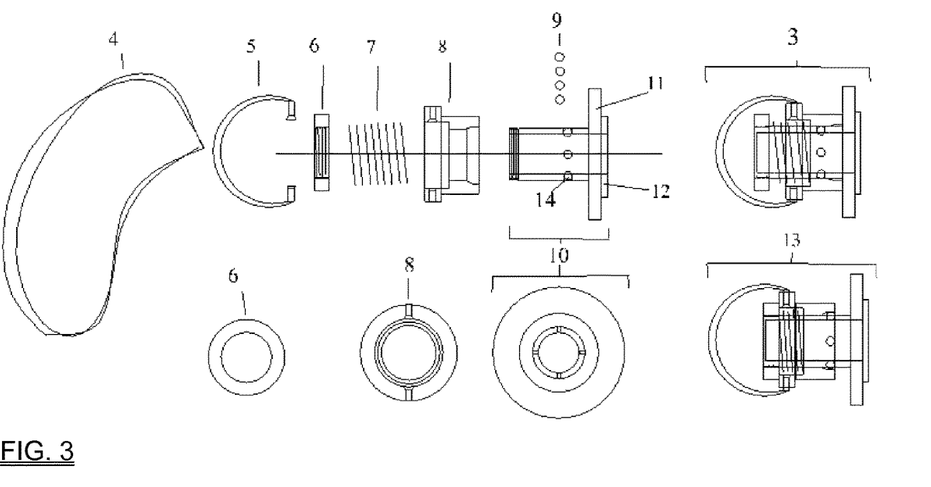
FIG. 3 is a detail view of the internal canopy locking and releasing mechanism as well as a single side view of the internal apparatus completely assembled.

The internal canopy retaining pin locking and release mechanism I is set forth in FIG. 3. The internal locking and retaining mechanism is demonstrated in locked position 3 and unlocked position 13. The internal locking and retaining mechanism 3 comprises a retaining spring 7 holding an outside slide 8 against an inside sleeve 10 and flange 11. The retaining spring 7 is held in place by a retaining collar 6, which is fastened by threading it onto the threaded end of the inside sleeve 10. The inside sleeve 10 comprises the internal canopy compression flange 11, a cavity or plurality of cavities 14 seating a ball or a plurality of locking balls, e.g. (4 balls) 9, seat for spring 7, limits the travel of the outside slide 8, contains a centering flange 12 for fitting to canopy 1, and also limits the travel of the canopy retaining pin 21 (FIG. 4) when the mechanism is in the locked position. When the outside slide 8 is placed in a locked position (a position located at limit of travel of outside slide 8 on inside sleeve 10), outside sleeve 8 is slidably directed towards the inside of the canopy abutting compression flange 11, and the four balls 9 move inward in race 14 and lock and hold the grooved canopy retaining pin 21 in a fixed or connected position. A clearly visible strap 4 is connected to the outside slide 8 via a semicircular ring 5. Pulling strap 4 allows for single pull release (pulling strap towards the driver) of the outside slide 8. This unlocks the four ball locks 9 when the outside slide 8 is moved slidably towards the retaining collar 6. Releasing the 4 ball locks 9 releases the canopy retaining pin 21. This then allows the canopy 1 to be opened.

Figure 4:
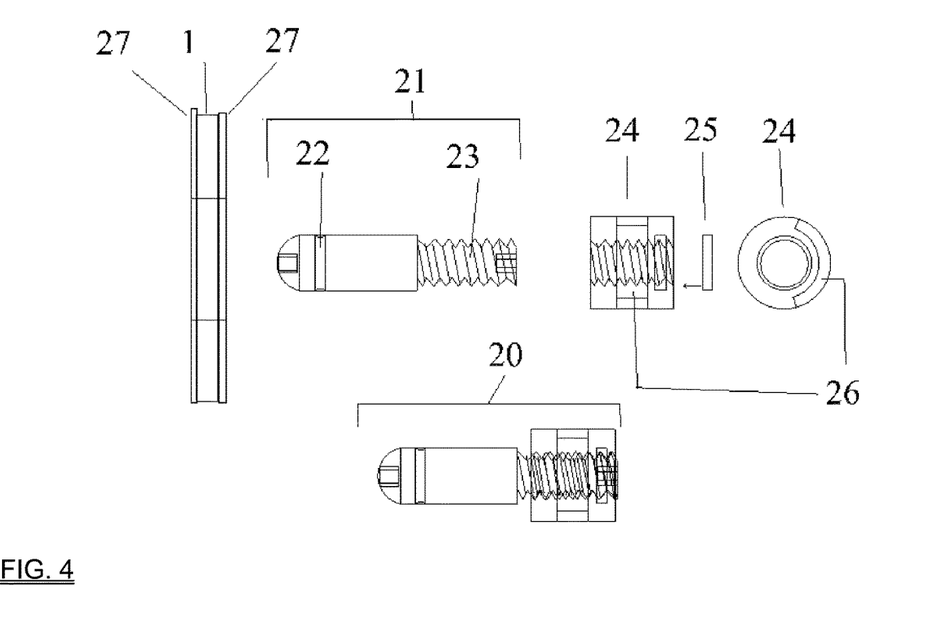
FIG. 4 is a detail view of the canopy retaining pin and grooved barrel mechanism as well as a single side view of a completely assembled canopy retaining pin and grooved barrel mechanism. Additionally, there is a side view of a portion of the canopy with reinforcing plates.
Figure 5:
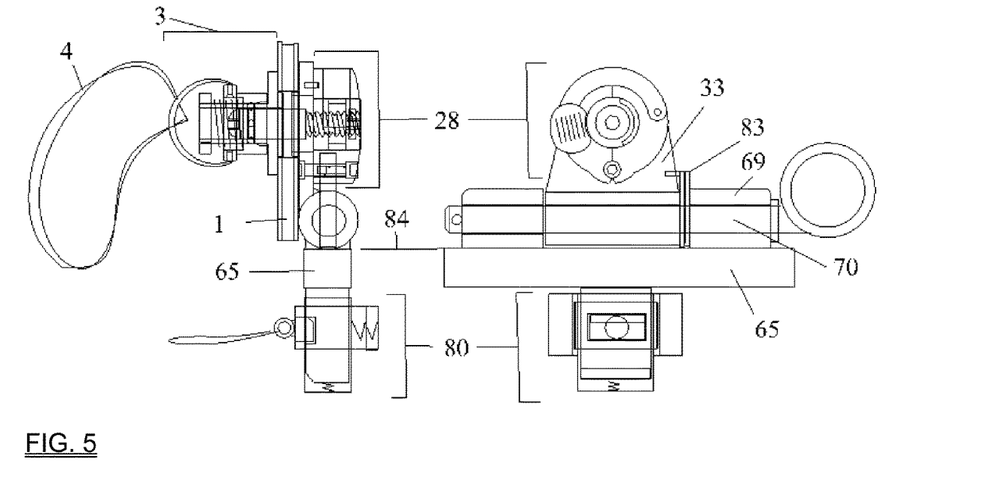
FIG. 5 is a lateral and frontal view of the canopy side mount locking and releasing outside (external) mechanism type A. The drawing also shows hinge plate and hinge base mechanism, and fuselage locking and releasing mechanism.
Figure 6:
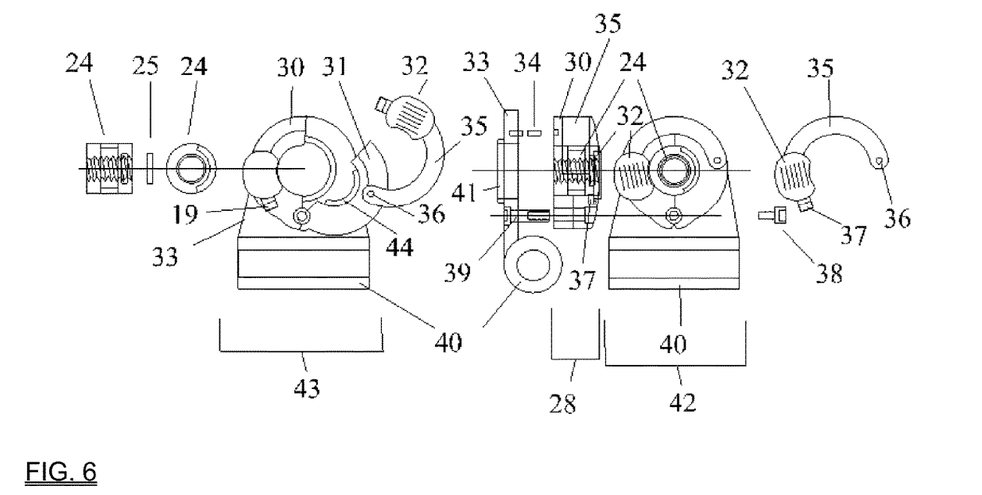
FIG. 6 is a detail view of the canopy outside (external) locking and release mechanism type A with round clamp and thumb release lock and leverage arm. Additionally shown is the hinge plate.

The canopy retaining pin assembly 20 is set forth in FIG. 4. Canopy retaining pin 21 is grooved 22 at one end and has a fastener such as threads 23 at the other. The grooved end 22 passes or extends into the internal pin locking and releasing mechanism 3 and is retained by a plurality such as four locking balls 9 described above. The canopy retaining pin 21 threaded end 23 is threaded into grooved and threaded barrel 24 and is described as assembly 20. This complete canopy retaining pin assembly 20 can be passed through the canopy from either the inside (inside cockpit) or outside (external to the canopy), and connected to the inside 3 or outside locking and releasing mechanisms Type A, B, or C. The canopy retaining pin 21 threaded end 22 passes or extends through the canopy 1 (with or without the canopy reinforcing plates 27), the hinge plate 33 (located against the outside of the canopy), and into a threaded and grooved barrel 24. The threaded and grooved barrel 24 contains an internal plastic locking ring 25 to hold the threaded end of the canopy retaining pin 21 in position so it does not rotate and loosen in respect to the threaded and grooved barrel 24. The internal plastic locking ring 25 is swaged into place in threaded and grooved barrel 24 so it does not move. The plastic locking ring 25 creates a lock effect on the threaded portion 23 of the canopy retaining pin 21 once the threaded portion 23 is inserted to the appropriate depth forming assembly 20. The threaded and grooved barrel 24 is retained in appropriate position on the outside of the canopy by the external locking and releasing device Type A or C. The threaded and grooved barrel 24 has a semicircular groove 26 on one side. Flange 44 of Type A external locking and releasing mechanism will fit into the semicircular groove 26 locking the threaded and grooved barrel 24, and thereby assembly 20, into place FIG. 6.

Figure 8:
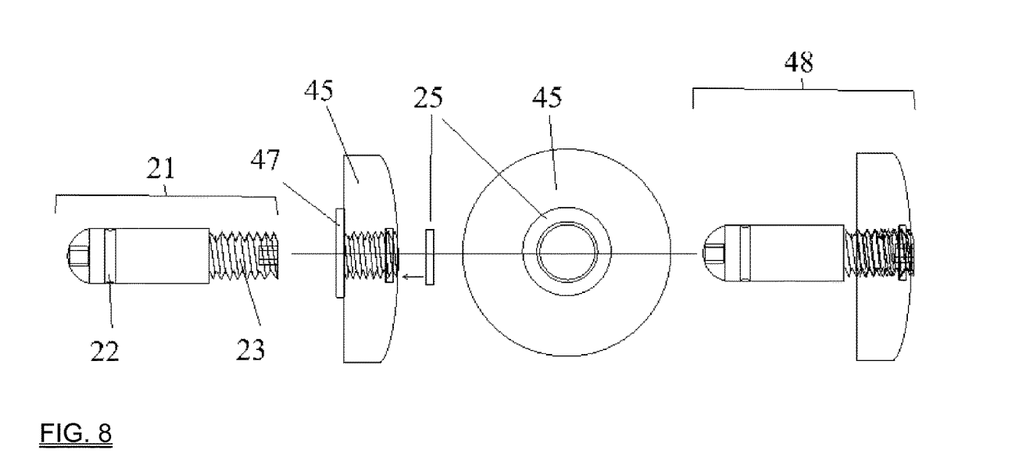
FIG. 8 is a detail view of the canopy outside (external) locking mechanism Type B with canopy retaining pin.

Alternatively, Type B external locking mechanism, see FIG. 8, can be utilized which does not require threaded and grooved barrel 24. Canopy retaining pin 21 threaded portion 23 is threaded into the Type B external locking mechanism and canopy retaining pin 21 is set to appropriate depth.

Figure 10:
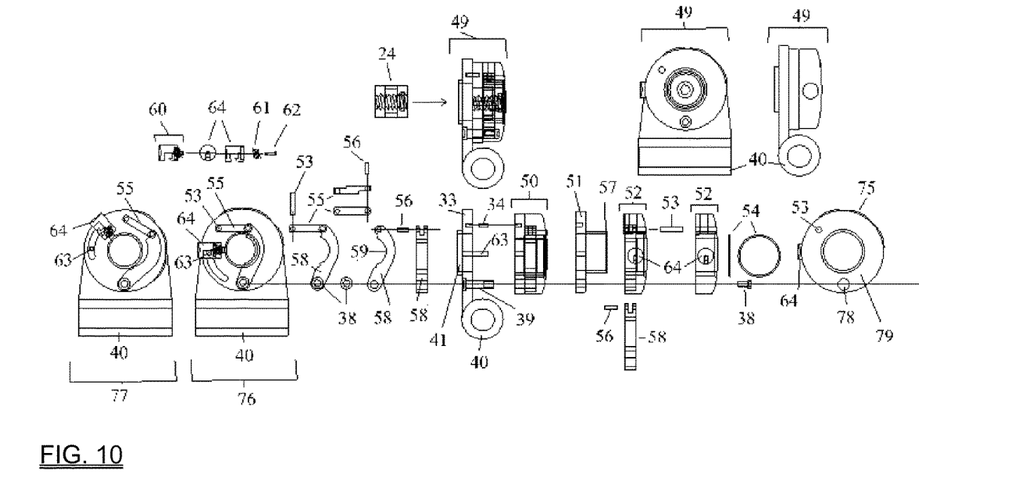
FIG. 10 is a detail view of the canopy outside (external) locking mechanism Type C. Additionally shown is the hinge plate, and grooved and threaded barrel.

Alternatively, Type C external locking and releasing mechanism will lock the semicircular groove 26 of the threaded and grooved barrel 24, and thereby canopy retaining pin assembly 20, into place via flange 59 FIG. 10.

The canopy retaining pin 21 can be tensioned, causing the appropriate compression of the canopy 1 and hinge plate 33 via the operative engagement of the internal and external canopy retaining pin locking or engaging and releasing mechanisms (Type A, B, or C), as by inserting the appropriate tool (such as an Allen type wrench) at either end of the canopy retaining pin 21 and turning in the correct direction. This will, by a fastener engagement such as by a screw, with force amplification, maintain compression or a force on the internal locking device 3 compression flange 11, canopy 1, hinge plate 33, and external locking device (Type A, B, or C), thereby maintaining a mechanical connection or engagement to the canopy by mechanical or operatively engaging connection to the canopy material 1 directly, or by compressing operatively or engaging canopy reinforcing plates 27 which act on the canopy material 1. The size and/or requirement of the canopy reinforcing plates 27 will be based on the canopy 1 material and is beyond the scope of this design.

The external canopy retaining pin locking and releasing mechanism Type A set forth in FIGS. 1,2, 5, and 6 is denoted as assembly 28 and is comprised primarily of semicircular clamp halves 30 and 31, a leverage arm 35, and a thumb lock 32. Round clamp halves 30 and 31 (comprising the round clamp) are bored in the center to receive the grooved barrel 24 of the canopy retaining pin assembly 20. The round clamp 30 and 31 is hinged at its inferior aspect locking screw 38 and locking screw hinge pin base 39 allowing one half of the clamp, 31, to hinge away from the canopy grooved retaining pin barrel 24 grooved side 26. The moveable half 31 of the round clamp 30 and 31 has a locking flange 44 that fits into the groove 26 of grooved barrel 24 which acts, when the round clamp halves 30 and 31 are closed and locked, to hold the barrel 24 of the canopy retaining pin assembly 20 from turning while tightening the screw portion 23 of pin 21. The moveable half 31 of round clamp 30 and 31 when in the closed and locked position, also maintains the canopy retaining pin assembly 20 in position axially inside the external canopy retaining pin locking and releasing mechanism Type A. The other half of the round clamp 30 and 31 is the non-mobile half 30 which is fixed into position in relation to the hinge plate 33 by the inferiorly positioned locking screw 38 and locking screw hinge pin base 39. Additionally, the non-mobile round clamp half 30 is fixed into position in relation to the hinge plate 33 by a second more superior pin 34 placed into the hinge plate 33 and the back side of non-mobile clamp half 30. There is a semicircular 'leverage' arm 35, extending from the moveable half of the round clamp 31 to the other fixed half of the round clamp 30, and which lies in the closed/locked position within a groove across the top of the round clamp halves 30 and 31. This semicircular 'leverage' arm 35 in conjunction with thumb release 32 and thumb lock tab 37 forms the locking mechanism of round clamp halves 30 and 31. On the movable half of the round clamp 31, the 'leverage' arm 35 is held in place at one end by a hinge pin 36. When closed, the 'leverage' arm 35 fits flush into a groove at the top of the round clamp halves 30 and 31 and held in place to the fixed half of the round clamp 30 by a thumb release 32 via thumb lock tab 37. Thumb lock tab 37 fits into angular lock 19 on fixed half 30 of round clamp. In one motion, the thumb release lock 32 can be depressed thereby releasing the locking tab 37, releasing the 'leverage' arm 35, and allowing extension of arm 35. By forcing the 'leverage' arm 35 away from the round clamp halves 30 and 31, the moveable half of the round clamp 31 and the locking flange 44, is pulled free from the grooved barrel 24. This allows the canopy retaining pin assembly 20 to pass through the hinge plate 33 and canopy 1 thereby allowing the canopy 1 to be opened. Centering of the Type A external locking and releasing mechanism is by means of a centering flange 41 which fits into canopy 1.

Figure 7:
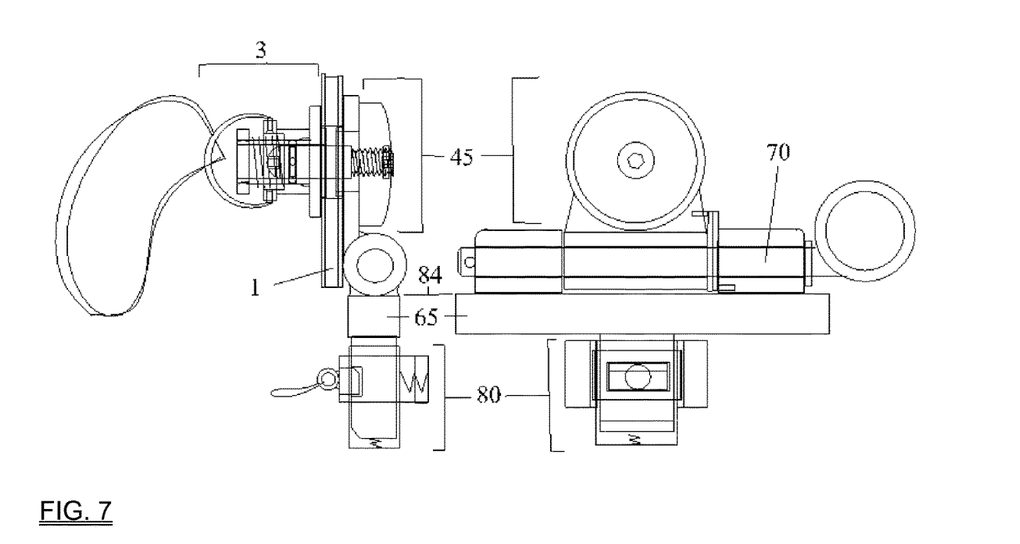
FIG. 7 is a lateral and frontal view of the canopy hinge lock and release mechanism with outside (external) locking mechanism Type B. The drawing also shows hinge plate mechanism and fuselage locking and releasing device.

The external canopy retaining pin locking and releasing mechanism, Type B, as set forth in FIGS. 2, 7 and 8, is a simple screw on an aerodynamic clamp that does not include a quick release mechanism. It is comprised of two parts: the threaded round plate 45 and the retaining locking ring/washer 25. The threaded round plate 45 contains an internal plastic locking washer 25 to lock the threaded end 23 of the canopy retaining pin 21 in position so it does not rotate and loosen. Hinge plate 33 is mounted against said canopy 1. The internal plastic locking ring 25 is swaged into place in the threaded round plate 45 so it does not move. The internal plastic locking ring 25 creates a lock effect on the threaded portion 23 of the canopy retaining pin 21 when canopy retaining pin 21 is inserted to the appropriate depth. Threaded round plate 45 has a centering flange 47 which maintains a centered position on hinge plate 33. The grooved barrel 24 is not required in the Type B external canopy retaining pin locking mechanism.

Figure 9:
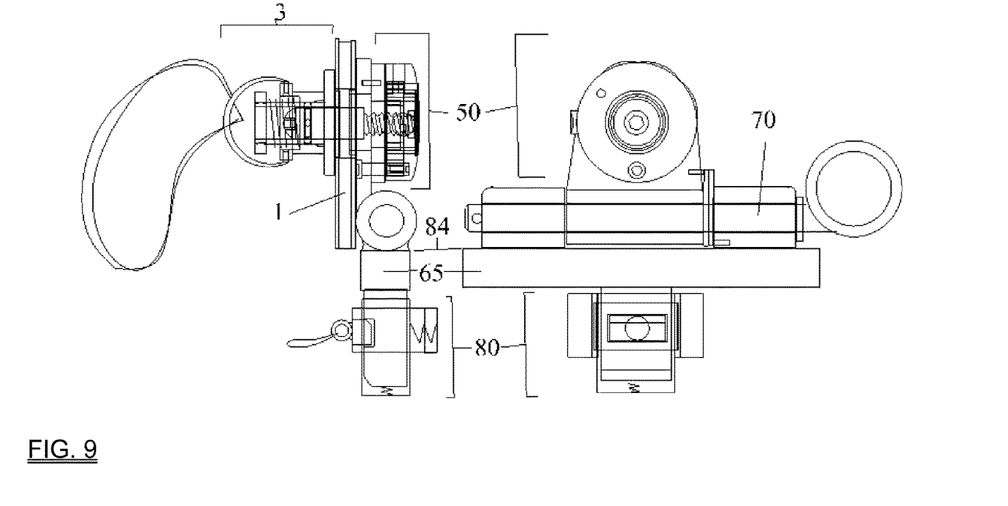
FIG. 9 is a lateral and frontal view of canopy hinge lock and release mechanism with outside (external) locking mechanism Type C. Drawing also shows hinge mechanism and fuselage locking and releasing device.

The external canopy retaining pin locking and releasing mechanism Type C, is set forth in FIGS. 2, 9, and 10. This embodiment is similar to the Type A locking and releasing mechanism but contains an internal locking mechanism under a rotating cover. The Type C mechanism is comprised of an outside rotating cover 79 containing an extension arm 55, locking arm 58, fixing pin 53, a thumb release lock assembly 60, base plate 51, and locking screw 38 and locking screw base 39. One end of locking arm 58 is connected to extension arm 55, and the other end is attached to locking screw 38 and locking screw base 39 upon which locking arm 58 hinges. Depressing the thumb release lock 64 allows rotation of the cover 79, thereby forcing the connected extension arm 55 against locking arm 58, and forcing locking flange 59 away from groove 26 of the threaded and grooved barrel 24. This releases canopy pin assembly 20 allowing it to pass through the hinge plate 33 and canopy 1, thereby allowing the canopy to be opened. The Type C external locking and releasing mechanism assembly 50 is attached to the hinge plate 33 by locking screw 38 and locking screw hinge pin base 39. The locking screw hinge pin base 39 passes through hinge plate 33, Type C base plate 51, and locking arm 58, and then capped by locking screw 38. Additionally, there is a fixing pin 34 maintaining position of Type C base plate 51 in relation to hinge plate 33, and against the rotational forces of turning and unlocking the Type C cover 79. Type C cover 79 is shown by side assembly view 52 with internal components. The extension arm 55 is fixed to round cover 79 by fixing pin 53. The Type C base plate 51 is also the mount for round cover assembly 52. Locking ring 54 holds the round cover assembly 52 in place on the base plate 51. Locking ring 54 locks into groove 57 of base plate 51. The thumb lock assembly 60 keeps the round cover 79 from rotating. The thumb lock barrel and catch 64 is held in place when in the locked position 76 by the thumb lock retaining pin 63. When the thumb barrel catch 64 is depressed, the cover 79 can be rotated from the locked position 76 to the unlocked position 77. Rotating cover 79 acts on extension arm 55, which acts on locking arm 58 releasing locking arm flange 59 from semicircular groove 26 of the canopy retain pin assembly 20. Locking arm 58 is fixed inferiorly by locking screw 38 and locking screw base 39. There is an access hole 78 in the round cover 79 to allow access to locking screw 38, thereby allowing the external locking mechanism assembly 50 to mounted to base plate 33. Finger grips 75, of round cover 79 are to assist grip when turning. The Type C thumb lock assembly 60 is comprised of the thumb lock barrel with catch 64, the thumb lock spring 61, and the thumb lock retaining screw 62. The thumb lock barrel with catch 64 locks onto the thumb lock retaining pin 63 in the locked position 76. When in unlocked position 77, the thumb lock retaining screw 62 maintains position of the thumb lock barrel with catch 64. When in the locked position 76, the thumb lock spring 61 maintains the locked position of the thumb lock barrel catch 64 onto thumb lock retaining pin 63. Type C mechanism assembly 50 with hinge plate 33 and grooved barrel 2 in side view 49.

Figure 11:
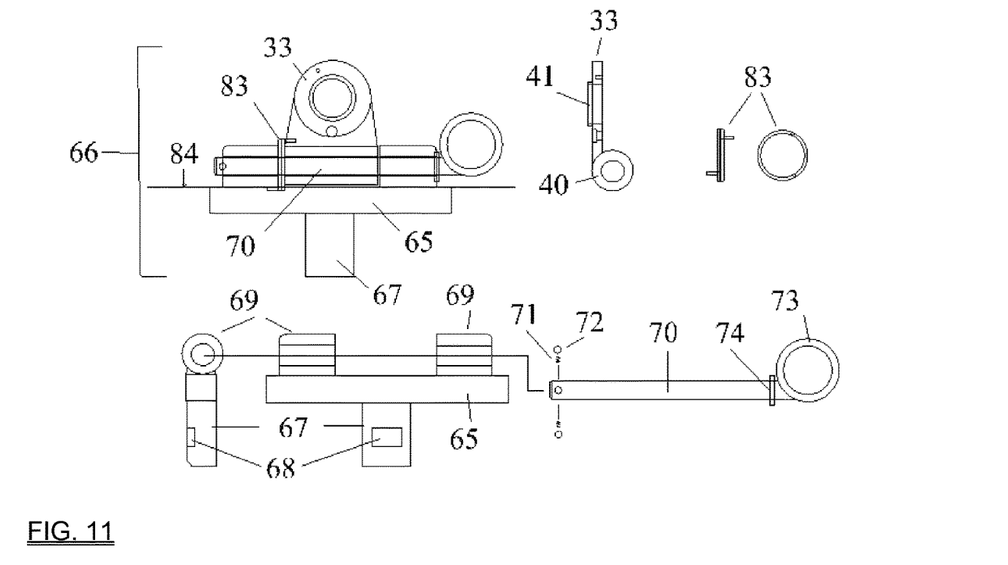
FIG. 11 is a view of the overall hinge mechanism. Additionally, there are detailed frontal and lateral views of the hinge mechanism with hinge retaining pin and hinge detail.

The hinge locking and releasing mechanism assembly 66 FIG. 11 is set forth in detail in FIG. 11 and also shown in FIGS. 1, 2, 5, 7, 9, 11 and is composed of three main components, the hinge plate 33 and the hinge base 65 that are operatively connected via a hinge retaining pin 70, and described as assembly 66. The hinge plate 33 is held against the outside (but could be placed on the inside) of the canopy 1 by the compression of the external and internal canopy retaining pin locking and releasing mechanisms via the canopy retaining pin assembly 20 for Types A and C external locking and releasing mechanisms or via the canopy pin 21 for the Type B external mechanism. The hinge plate 33 has a lower barrel 40 which parallels the direction of the side of the canopy 1 and is connected to the fuselage mounted hinge base 65 barrels 69 by a hinge retaining pin 70. The hinge retaining pin 70 has a pull handle 73 and travel stop 74 on one end and dual spring 71 and ball locks 72 on the other end. The hinge retaining pin 70 ball locks are comprised of springs 71 and balls 72 swaged into the hinge retaining pin 70 end. The hinge base 65 is the support for two hinge barrels 69 which in effect sandwich the hinge plate barrel 40 at either end, and the hinge pin 70 is passed through barrels 69 and 40 forming the hinge mechanism assembly 66. At the hinge base 65 inferior edge, there is an inferiorly projecting tab 67. The inferiorly projecting tab 67 has a locking recess 68. The inferiorly projecting tab 67 is inserted in a vertical direction into the fuselage locking and releasing mechanism 80 shown in FIG. 12, and retained in position by the fuselage locking and releasing mechanism 80, thereby fixating the hinge mechanism and its above-described components to the fuselage.

Figure 12:
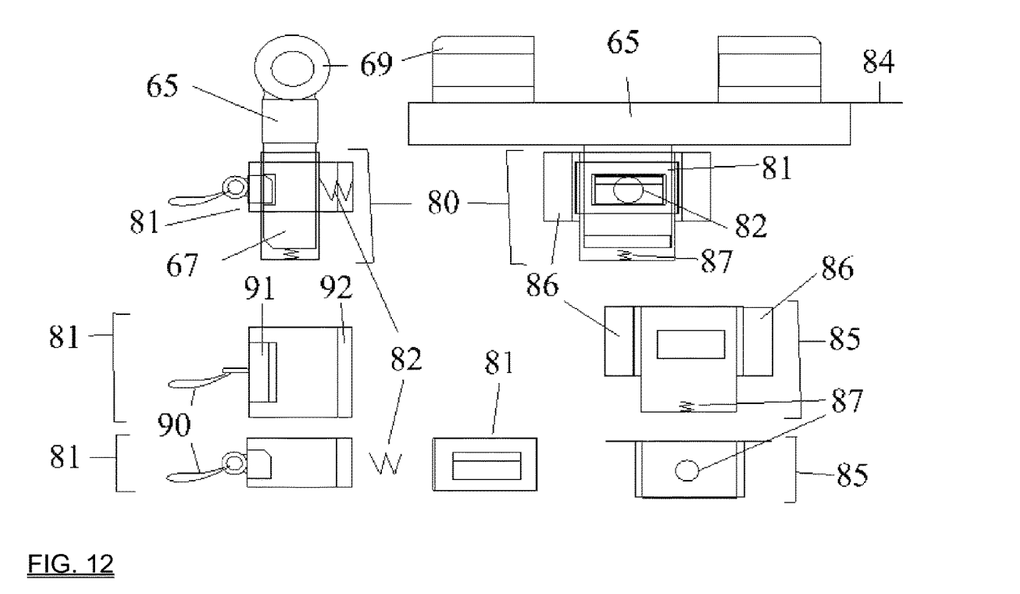
FIG. 12 is a frontal and lateral view of the fuselage locking and releasing mechanism with the hinge base. Additionally, there is a detail view of the fuselage locking and releasing mechanism.

The fuselage locking and releasing mechanism 80 is set forth in FIG. 12 for engagement with hinge mechanism 66 FIG. 11, and is composed of a locking tab 91 held into locking recess 68 on the inferiorly projecting tab 67 by a spring 82. The cockpit internal pull strap 90, the locking tab 91, the spring 82, and the cockpit external push button 92, and the structure they are mounted to is described as one assembly 81. Assembly 81 comprises the moveable parts of the fuselage locking and releasing mechanism and fits into the fuselage locking and releasing housing/mount 85 and is operatively connected to said hinge base locking and releasing mechanism. The fuselage locking and releasing mechanism housing/mount 85 has fasteners such as side tabs 86 to allow for installation into the fuselage. The fuselage locking and releasing mechanism housing/mount 85 has a spring 87 which assists in ejecting the inferiorly projecting tab 67 when the fuselage locking and releasing mechanism is unlocked via the pull strap 90 or the push button 92. The locking tab 91 is released from the inferiorly projecting tab 67 locking recess 68 by two methods. One method is by pulling on strap 90 while inside the cockpit or pushing the release button 92 from outside the cockpit. This will unlock the hinge assembly 66 from the fuselage locking and releasing mechanism 80, generally located below fuselage level 84, allowing for the canopy to be opened and accessed from either side. This would be the standard method of locking and releasing the canopy.

The present invention can be utilized whenever any type of canopy or shield or cover with access to cockpit or drivers chair, and/or a passenger's chair, is utilized. While a preferred embodiment relates to a racing car, for example an Indy or Formula one style race car, mechanisms of the present invention can be utilized for other vehicles that have either open, or closed cockpits, and utilized for access via but not limited to panels or canopies, or shields, the described locking and releasing canopy mechanisms of the present invention can be utilized. Thus, other uses include canopies for tractors, trains, trains, automobiles, truck cabs, moving vehicles, mobile and non-mobile equipment shields, and wherever such canopies or shields can be installed or utilized. The canopies can generally be made of any type of transparent material such as polyurethanes, polyacrylates, and polycarbonates, or any combination thereof when transparency is desired. If opaque canopies are utilized, they can generally be made out of any type of plastic including polyesters, polyolefins such as polyethylene and polypropylene, phenolic resins, polyacrylonitriles, polyamides, various rubbers, polyimides, polystyrene, polytetrafluoroethylene, and polyvinyl chloride. When panels or shields are utilized, they can be made out of plastics or any conventional type of wood, or metals such as aluminum, steel, copper, and the like as well as various composite laminates.

Figure 13:
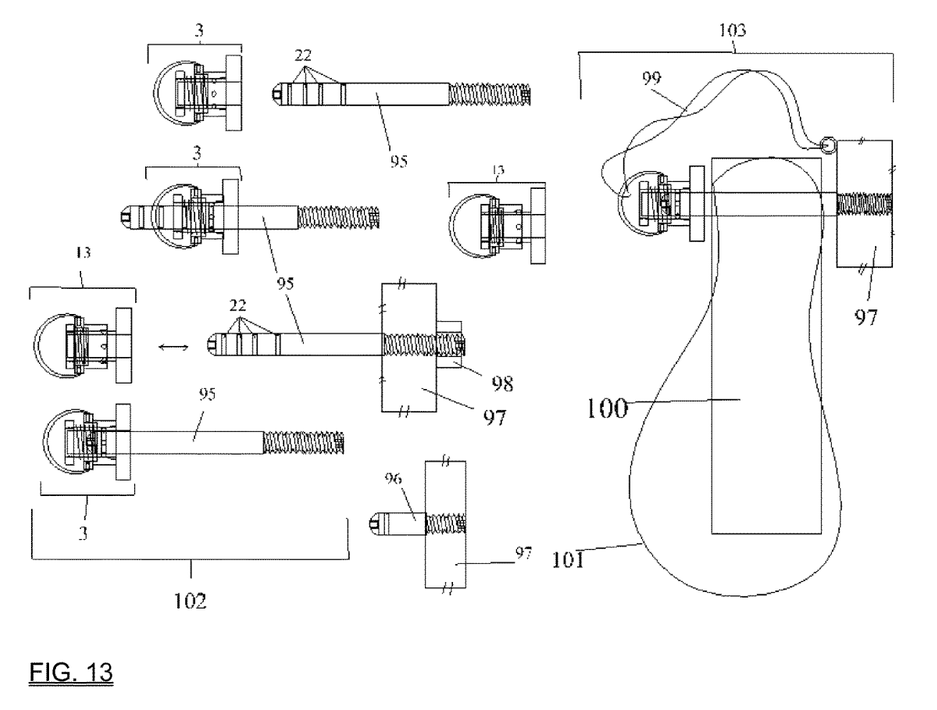
FIG. 13 is a detailed view of alternative uses for the Pin Locking and releasing mechanism.

Set forth in FIG. 13 is an alternative use/uses for the locking and releasing mechanism 3 with the retaining pin 70 (as by example shown in assembly 103, FIG. 13) and may be applied to retain other soft 101 or hard 100 items (such as containers, fire extinguishers, and/or other equipment or components) and placed inside or outside of a vehicle or other mobile or non-mobile machines or structures. Locking and releasing mechanism 3 is shown in unlocked position 13, and the functionality of this mechanism has been described in detail in earlier sections and in FIG. 3. The retaining pin 70 or 95 may be varied in length such as a long length retaining pin 95 or a short length retaining pin 96 or other sizes as needed. Additional grooves, for example a plurality of grooves 22, may machined into pin 95 or other sized retaining pins as needed. Locking and releasing mechanism 3 placed by slidable fitment onto retaining pin 95 forms assembly 102. The remaining end of pin 95 contains a fastener such as threads. Assembly 102 may be placed into a bulkhead 97, or other such fixed structure forming assembly 103. The retaining pin may be fixed to the bulkhead by screw force attachment, or by addition of retaining nut 98. Objects 100 and 102, as noted above, as well as canopies, shields, panels, etc., can be secured between said internal locking and releasing mechanism 3 and said bulkhead 97. Strap 99 provides a means of pulling on the locking and releasing mechanism 3 of assembly 103. Additionally, strap 99 prevents loss of the locking and releasing assembly 3.

While in accordance with the Patent Statutes, the best mode and preferred embodiments have been set forth, the scope of the invention is not limited thereto, but rather, by the scope of the attached claims.

LIST OF REFERENCE NUMBERS

1 Portion of canopy
2 Portion of fuselage
3 Internal locking and releasing mechanism assembly 'Locked position'
4 Pull strap
5 Pull strap ring
6 Threaded retaining collar
7 Spring
8 Outside slide
9 retaining ball or balls
10 Inside sleeve
11 Inside sleeve compression flange
12 Inside sleeve centering flange
13 Internal locking and releasing mechanism assembly 'Released position'
14 Inside sleeve cavity or cavities for retaining ball or balls
19 Angular lock for lock tab 37
20 Canopy retaining pin with grooved and threaded barrel assembled
21 Canopy retaining pin
22 Grooved end of canopy retaining pin
23 Threaded end of canopy retaining pin
24 grooved and threaded barrel
25 nylon lock washer
26 semicircular groove in grooved and threaded barrel
27 Canopy reinforcing plate
28 Type A round clamp assembly
29 Type A round clamp mechanism assembled
30 Fixed half of round clamp
31 Moveable half of round clamp
32 Thumb lock for Type A external locking and releasing mechanism
33 Hinge plate
34 Locking pin
35 Leverage arm
36 Leverage arm pin
37 Thumb lock locking tab
38 Locking screw
39 Locking screw hinge pin base
40 Hinge barrel of hinge flange
41 Centering flange of hinge plate (33)
42 Type A round clamp mechanism assembled 'Locked position'
43 Type A round clamp mechanism assembled 'Released position'
44 Locking flange of (31) that fits into groove (26) of grooved and threaded barrel (24)
45 Type B Threaded and round plate
46 Type B with Canopy retaining pin
47 Type B Threaded and round plate centering flange.
48 Type B external locking mechanism with canopy retaining pin
49 Type C external locking and releasing mechanism assembled with hinge plate
50 Type C external locking and releasing mechanism assembled
51 Type C base plate for cover (79)
52 Round cover containing thumb locking mechanism and locking arm
53 Extension arm fixing pin
54 Locking ring
55 Extension arm 56 Extension arm to locking arm connecting pin
57 Groove for locking ring (54)
58 Locking arm
59 Locking arm flange that fits into groove (26) of grooved and threaded barrel (24)
60 Thumb lock push button mechanism assembled
61 Thumb lock spring
62 Thumb lock retaining screw
63 Thumb lock retaining pin
64 Thumb lock barrel with catch
65 Hinge base
66 Hinge base locking and releasing assembly
67 Locking tab of hinge base
68 Locking tab recess
69 Hinge barrel of hinge base
70 Hinge retaining pin
71 Hinge retaining pin ball lock spring
72 Hinge retaining pin ball lock
73 Hinge retaining pin Pull handle
74 Hinge retaining pin travel stop
75 Type C cover finger grips
76 Type C external locking and releasing mechanism 'Locked position'
77 Type C external locking and releasing mechanism 'released position'
78 Type C cover access hole for locking screw (38)
79 Type C cover
80 Fuselage locking and releasing mechanism assembled
81 Locking tab and button mount
82 Locking tab and button mount retaining spring
83 Hinge plate spring
84 Level of fuselage
85 Fuselage locking and releasing mechanism mounting base
86 Fuselage locking and releasing mechanism mounting fastener
87 Fuselage locking and releasing mechanism ejecting spring
90 Internal pull strap
91 locking tab
92 External push button
95 Long length retaining pin
96 Short length retaining pin
97 Bulkhead
98 Nut
99 Strap
100 Hard object
101 Soft object
102 Complete pin locking and releasing assembly

What is claimed is:

1. A canopy locking and releasing apparatus, comprising:
    (a) an internal canopy locking and releasing mechanism comprising an outside sleeve held in place by a spring, and an inside sleeve slidably fitting within said outside sleeve, said inside sleeve having one or a plurality of cavities, a ball or plurality of balls located within at least one said cavity, said inside sleeve having a retaining flange;
    (b) a canopy retaining pin having a groove at one end and fastener at the other end, wherein said balls are capable of being located in said groove and engaging and retaining said inside sleeve in a fixed position with respect to said canopy retaining pin,
    (c) a threaded and grooved barrel capable of being attached to the fastener end of said canopy retaining pin;
    (d) a hinge plate located adjacent to said canopy
    (e) said canopy retaining pin extending through said canopy hinge plate, said canopy, and into said internal locking and releasing mechanism, with or without said threaded and grooved barrel;
    (f) an external locking and releasing mechanism assemblies capable of engaging and releasing said fastening end of said canopy retaining pin, with or without the use of said threaded and grooved barrel, and in assembly with said canopy pin and an internal canopy locking and releasing mechanism, operatively capable of compressing and clamping said inside sleeve flange and said hinge plate against said canopy;
    (g) said hinge plate operatively connected to a hinge base with a removable hinge pin, forming a canopy hinge mechanism;
    (h) said hinge base attached to a fuselage with a fuselage locking and releasing mechanism;
    (i) said canopy locking and releasing apparatus having a plurality of internal and external locking and releasing mechanisms allowing cockpit access from one side or other side of vehicle, or both sides at once and;
    (i) said internal canopy locking and releasing mechanism utilized with said canopy retaining pin forming a locking and releasing and retaining pin apparatus.

2. The canopy internal locking and releasing apparatus of claim 1, comprising a collar, said collar being fastened to said inside sleeve, wherein a spring is located between said collar and said outside sleeve, and wherein a pull strap is connected to said outside slide so that upon pulling said strap or directly on outside sleeve said outside sleeve is slidably moved on said inside sleeve so that said ball, or plurality of balls, located within said inside sleeve cavity is released, releasing said canopy retaining pin, thereby allowing said canopy to be opened.

3. The internal canopy locking and release apparatus of claim 2, wherein said internal canopy lock and release mechanism when in assembly with said canopy retaining pin and said canopy retaining pin passes through said canopy and said hinge plate, and said canopy retaining pin fastened to said barrel, and said barrel locked into the external locking and releasing mechanism, thereby forming a canopy clamping assembly wherein said canopy retaining pin threaded fastener end is adjusted by a screw mechanism in relation to its position within said barrel to increase or decrease a clamping force.

4. The canopy locking and release apparatus of claim 2, wherein said internal canopy lock and release mechanism when in assembly with said canopy retaining pin, and said canopy retaining pin threaded end is fastened to said threaded plate, and said canopy retaining pin passes through said canopy and said hinge plate, then forms a canopy clamping assembly wherein said canopy retaining pin threaded fastener end is adjusted by a screw mechanism in relation to its position within said threaded plate to increase or decrease clamping force.

5. The internal canopy locking and release apparatus of claim 2, wherein said internal canopy lock and release mechanism when in assembly with said canopy retaining pin, and said canopy retaining pin passes through said canopy and said hinge plate, and said canopy retaining pin fastened to said barrel, and said barrel locked into the external locking and releasing mechanism, thereby forms a canopy clamping assembly, wherein said canopy retaining pin threaded fastener end is adjusted by screw mechanism in relation to its position within said barrel to increase or decrease clamping force.

6. The canopy locking and releasing apparatus of claim 1, wherein a barrel engages said canopy retaining pin fastener end forming a canopy retaining pin assembly, and wherein said barrel and said retaining pin fastener end is threaded.

7. The canopy locking and releasing apparatus of claim 6, including a screw mechanism, wherein said threaded barrel and said threaded retaining pin fastener end engage one another, wherein said retaining pin threaded fastener end is adjusted by said screw mechanism in relation to its position within said threaded barrel.

8. The canopy locking and releasing apparatus of claim 6, where said barrel has a groove on its side and contains an internal lock washer.

9. The canopy locking and release apparatus of claim 1, wherein an external clamp receives said barrel engaging said canopy retaining pin, wherein said clamp contains a fixed portion and a movable portion, and wherein said clamp fixed portion and said clamp movable portion are capable of being closed about said barrel engaging said canopy retaining pin so that the same are fixedly releasably attached to each other.

10. The canopy locking and releasing apparatus of claim 9, wherein said external locking and releasing mechanism comprises a locking mechanism which releasably attaches into the groove of said threaded and grooved barrel.

11. The canopy locking and releasing apparatus of claim 9, wherein said external locking and releasing mechanism has a leverage arm.

12. The canopy locking and releasing apparatus of claim 9, wherein said external locking and releasing mechanism has a thumb lock and release.

13. The canopy locking and release apparatus of claim 9, wherein when said movable portion of said clamp is open, said external locking and release mechanism being capable of being pulled free of said barrel engaging said canopy pin allowing said canopy retaining pin assembly to pass through said hinge plate thereby allowing said canopy to be opened.

14. The canopy locking and release apparatus of claim 9, including a locking screw, wherein said external locking and releasing mechanism is attached to said hinge plate via said locking screw.

15. The canopy locking and releasing apparatus of claim 1, wherein said external locking and releasing mechanism comprises a clamp containing a bore, wherein said bore receives said barrel engaging said canopy retaining pin.

16. The canopy locking and releasing apparatus of claim 1, wherein said external locking and release mechanism comprises a threaded plate and retaining lock washer, with said lock washer fixating said canopy retaining pin fastener threaded end in the appropriate position.

17. The canopy locking and releasing apparatus of claim 1, wherein said external locking and releasing mechanism has a rotating cover, a locking arm having an extension arm thereon, and a releasing lock assembly, said locking assembly upon being released allowing said cover to be rotated thereby forcing said extension arm against said locking arm and forcing said locking arm locking flange away from said groove of said threaded barrel, thereby releasing the canopy retaining pin assembly allowing said canopy retaining pin assembly to pass through said hinge plate thereby allowing said canopy to be opened.

18. The canopy locking and releasing apparatus of claim 17, wherein said external locking and releasing mechanism is attached to said hinge plate via the locking screw.

19. The canopy locking and releasing apparatus of claim 17, wherein said external locking and releasing mechanism comprises a locking mechanism which releasably attaches into a groove of said threaded and grooved barrel.

20. The canopy locking and releasing apparatus of claim 17, wherein said external locking and releasing mechanism has a rotating cover attached to a base plate by a locking ring.

21. The canopy locking and releasing apparatus of claim 17, wherein said external locking and releasing mechanism has a thumb lock and release.

22. The canopy locking and releasing mechanism of claim 1, comprising a hinge plate, a hinge pin, and a hinge base; wherein said hinge plate has a barrel, said hinge base having a barrel or plurality of barrels, wherein said hinge plate is operatively connected to said hinge base via a removable hinge pin.

23. The canopy locking and releasing mechanism of claim 22, wherein the hinge plate is placed adjacent to said canopy.

24. The canopy locking and releasing mechanism of claim 22, wherein a hinge spring is retained by said removable hinge pin.

25. The canopy locking and releasing mechanism of claim 22, wherein said hinge base is capable of releasably engaging said fuselage locking and releasing mechanism.

26. The canopy locking and releasing mechanism of claim 22, wherein said hinge base is capable releasably engaging said fuselage locking and releasing mechanism and the fuselage, wherein said engagement increases the torsional rigidity of said hinge base.

27. The canopy locking and releasing mechanism of claim 1, wherein said fuselage locking and releasing apparatus is capable of being installed in a fuselage.

28. The canopy locking and releasing mechanism of claim 27, wherein said fuselage locking and releasing mechanism assembly having a fastener or fasteners that are capable of being installed into said fuselage.

29. The canopy locking and releasing mechanism of claim 27, wherein a locking and releasing mechanism releasably engaging the engages said hinge base.

30. The canopy locking and releasing mechanism of claim 27, that is opened from the inside of said fuselage or from the outside of said fuselage thereby releasing said hinge base allowing the canopy to be opened, allowing for cockpit access or egress from either side of vehicle.

31. The canopy locking and releasing mechanism of claim 1, is comprised of said internal canopy locking and releasing mechanism utilized with said canopy retaining pin, wherein said locking and releasing mechanism is slidably attached to said canopy retaining pin forming a locking and releasing and retaining pin apparatus.

32. The canopy locking and releasing mechanism of claim 31, wherein said retaining pin is mounted to a bulkhead or other structure so that a canopy, shield, or other object is placed onto said retaining pin, and position of said object is maintained by said locking and releasing mechanism.

33. The canopy locking and releasing mechanism of claim 32, wherein said retaining pin is attached to a bulkhead or other fixed or mobile structure wherein the attachment is by means of said retaining pin fastener end, welding, a press fit or screw nut.

34. The canopy locking and releasing mechanism of claim 31, wherein said locking and releasing mechanism is slidably placed on said retaining pin.

35. The canopy locking and releasing mechanism of claim 31, wherein said retaining pin has one or a plurality of locking grooves.

* * * * *

UNITED STATES PATENT AND TRADEMARK OFFICE
CERTIFICATE OF CORRECTION

PATENT NO. : 10,272,755 B2
APPLICATION NO. : 14/922653
DATED : April 30, 2019
INVENTOR(S) : Frederick G. Meoli et al.

It is certified that error appears in the above-identified patent and that said Letters Patent is hereby corrected as shown below:

In the Claims

Column 12, Claim 2, Line 1, "internal" - should be deleted.
Column 13, Claim 9, Line 7, "fixedly" - should be deleted.

Signed and Sealed this
Twenty-fifth Day of June, 2019

Andrei Iancu
*Director of the United States Patent and Trademark Office*